United States Patent [19]
Bohn

[11] Patent Number: 5,726,446
[45] Date of Patent: Mar. 10, 1998

[54] LINE-FOCUS SYSTEM WITH A SELF-ADHESIVE OCCLUDING APERTURE ATTACHED TO A LIGHT SOURCE

[75] Inventor: David D. Bohn, Ft. Collins, Colo.

[73] Assignee: Hewlett Packard Company, Palo Alto, Calif.

[21] Appl. No.: 551,013

[22] Filed: Oct. 31, 1995

[51] Int. Cl.⁶ ............................................. F21M 3/14
[52] U.S. Cl. ................... 250/237 R; 250/216; 362/255
[58] Field of Search ............................ 250/237 R, 234, 250/235, 208.1, 216; 358/494; 362/255; 355/68, 71

[56] References Cited

U.S. PATENT DOCUMENTS

| | | | |
|---|---|---|---|
| 4,547,813 | 10/1985 | McGraw et al. | 358/285 |
| 4,959,541 | 9/1990 | Boyd | 250/237 |
| 5,019,703 | 5/1991 | Boyd et al. | 250/208.1 |
| 5,101,330 | 3/1992 | Suzuki | 362/256 |

*Primary Examiner*—Edward P. Westin
*Assistant Examiner*—Kevin Pyo
*Attorney, Agent, or Firm*—Cynthia S. Baan

[57] ABSTRACT

A line-focus system with a bulb in a bulb enclosure assembly, where the bulb has a lamp label attached to it in such a manner as to create an occluding aperture for directing light from the bulb toward the scan line in the line-focus system. The lamp label is shaped in such a manner that the light intensity across the photosensor line array in the line-focus system is relatively uniform. The lamp label is furthermore of an opaque, non-reflecting nature so as to prevent any stray light from being reflected into the line-focus system.

2 Claims, 16 Drawing Sheets

LINE-FOCUS SYSTEM WITH A SELF-ADHESIVE OCCLUDING APERTURE ATTACHED TO A LIGHT SOURCE

FIELD OF THE INVENTION

The present invention relates generally to line-focus systems and, more particularly, to a method of constructing a compensating aperture for a line-focus system which enables a more accurate measurement of light intensity across a scan line.

BACKGROUND OF THE INVENTION

Line-focus systems are utilized in optical scanners and other optical imaging devices. In a line-focus system, a light beam from an illuminated line object is imaged by a lens onto a linear photosensor array which is positioned remotely from line object. The linear photosensor array is a single-dimension array of photoelements which correspond to small area locations on the line object. These small area locations on the line object are commonly referred to as "picture elements" or "pixels". In response to light from its corresponding pixel location on the line object, each photosensor produces a data signal which is representative of the light intensity which it experiences. All of the photoelement data signals are received and processed by an appropriate data processing system. In an optical scanning device, the illuminated line object of the line-focus system is commonly referred to as a "scan line".

A problem experienced in most line-focus systems is that the light intensity of the image produced at the linear photosensor array is not uniformly proportional to the light intensity at the line object. Generally, if a line object is every illuminated across its length, the light intensity at the sensor is much brighter in the area corresponding to the center of the line object than in the areas corresponding to the ends of the line object. This effect is quite significant; the intensity at the line image center may be roughly twice the intensity as that at the ends. There are several different optical effects which produce this problem. These optical effects are due mainly to the different distances of the various points on the line object from the central axis of the lens.

It is known in the prior art relating to line-focus systems to utilize an aperture positioned in the light path between a line object and a photosensor to differentially occlude light in the light path extending between the line object and the photosensor. Such "occluding" or "compensating" apertures are designed to occlude a proportionally greater portion of the light at the center of the light path than at the ends so as to make the light intensity at the photosensor uniformly proportional to the light intensity at the line object. Heretofore, solutions have usually consisted of an aluminum die casting or injection molded plastic part that was used to provide a more uniform light field and also to block out stray light from the optical system. The disadvantages of these prior solutions are the need for additional parts and part fasteners along with the assembly of the additional parts and part fasteners. These additional parts and part fasteners and the assembly thereof have also added to the cost of the optical scanner systems through additional parts and labor. These additional parts can also add to the size and weight of the optical scanner systems. Moreover, the use of these additional parts to occlude the light places limits on the location and the location tolerance of the line object, which generally creates a greater than desirable angle between the light source and the scan line.

Accordingly, there is a need in the field for an occluding aperture for a line focus system which produces a light intensity at a linear photosensor array which is uniformly proportional to the light intensity at a line object, wherein the means for producing an occluding aperture has fewer parts, lower part costs, lower tooling costs and lower assembly costs than occluding apertures of the prior art. Moreover, there is a need in the field for an occluding aperture for a line focus system that does not place limits on the location and the location tolerance of the line object. There is yet a further need in the field for an occluding aperture for a line-focus system that is easier to change the aperture and light profile than occluding apertures of the prior art.

SUMMARY OF THE INVENTION

The present invention comprises a line-focus system with a bulb in a bulb enclosure assembly, wherein the bulb has a lamp label attached thereto in order to create an aperture for directing the light from the bulb toward the scan line in the line-focus system. The lamp label being shaped in such a manner that the light intensity across the photosensor line array in the line-focus system is relatively uniform. The lamp label is furthermore of an opaque, non-reflecting nature so as to prevent any stray light from being reflected into the line-focus system.

DETAILED DESCRIPTION OF THE INVENTION

Figure 1:
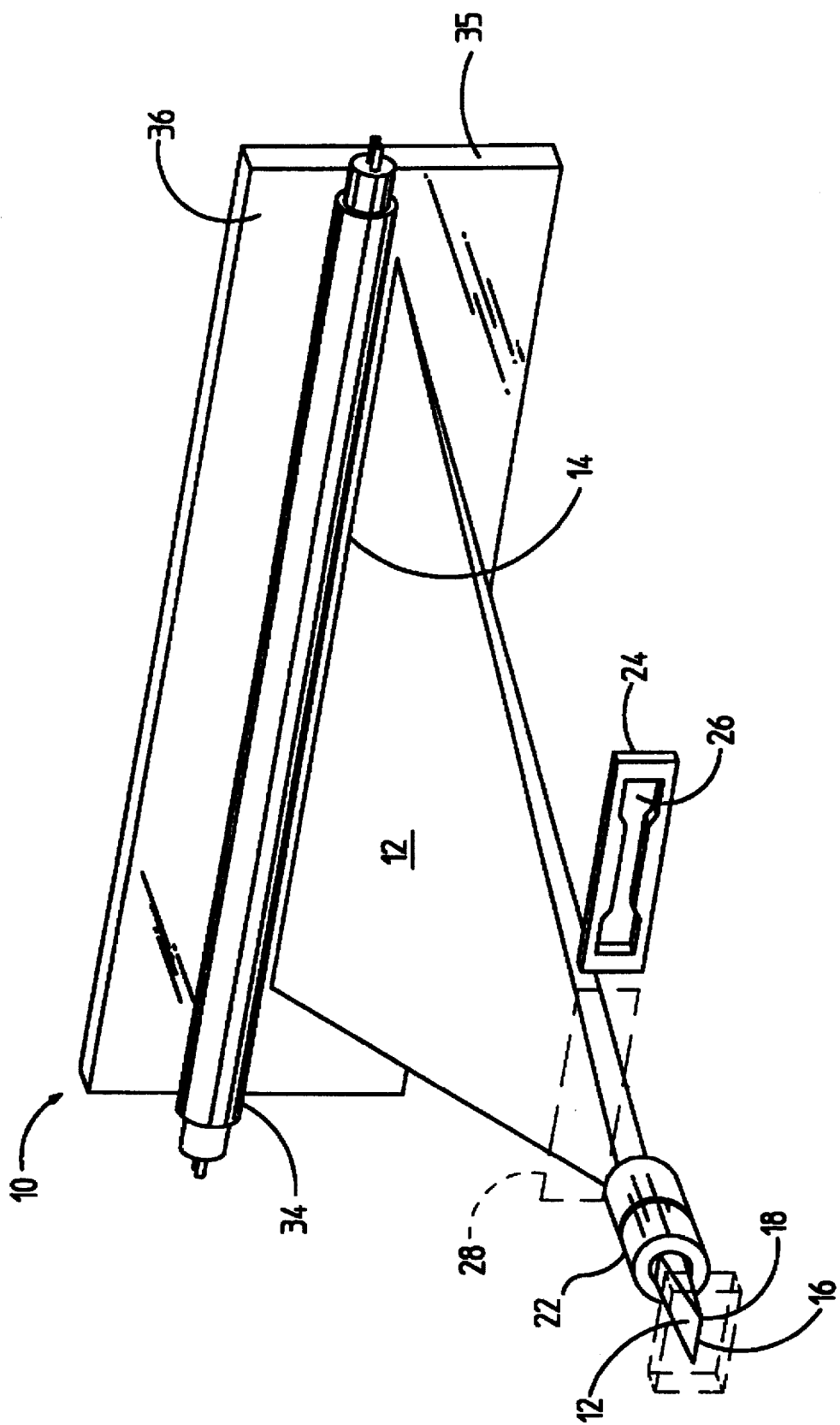
FIG. 1 is a schematic perspective view of a line-focus system.
Figure 2:
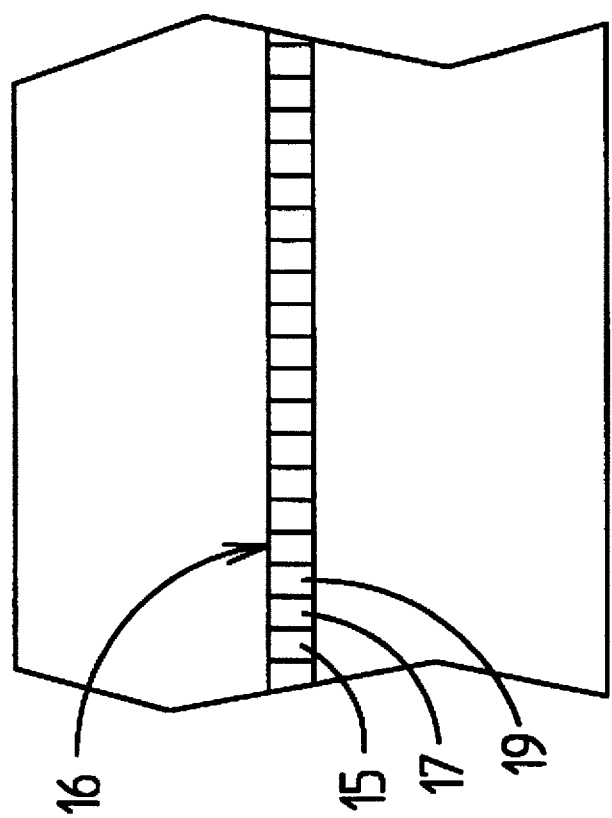
FIG. 2 is a detail plane view of a linear photosensor array.

FIG. 1 illustrates a line-focus system 10 having a light path 12 extending between an illuminated line object 14 and a linear photosensor array 16. A line image 18 of the illuminated line object 14 is projected onto the linear photosensor array 16 by a lens assembly 22. The linear photosensor array 16 as illustrated in the detail view of FIG. 2 comprises a plurality of linearly aligned photoelements 15, 17, 19 etc., which correspond to pixel locations on the line object 14. Each photoelement produces a signal proportionate to the intensity of light which it receives. Linear photosensors are well-known in the art.

An aperture member 24 having an aperture opening 26 which has a predetermined shape is adapted to be positioned at a predetermined aperture location 28 along the light path 12. The aperture member 24 is designed to partially occlude light in light path 12 to provide a light intensity across sensor 16 which is uniformly proportional to light intensity of the illuminated fine object 14. Note that aperture member 24 is placed between the object 35 and the image.

In FIG. 1, an illumination device such as fluorescent bulb 34 provides light which is reflected from an object 35 having a white, planar forward surface 36. The position and length of line object 14 on surface 36 is defined by the position and optical characteristics of an imaging lens 22 and by the length of linear photosensor array 16.

Figure 3:
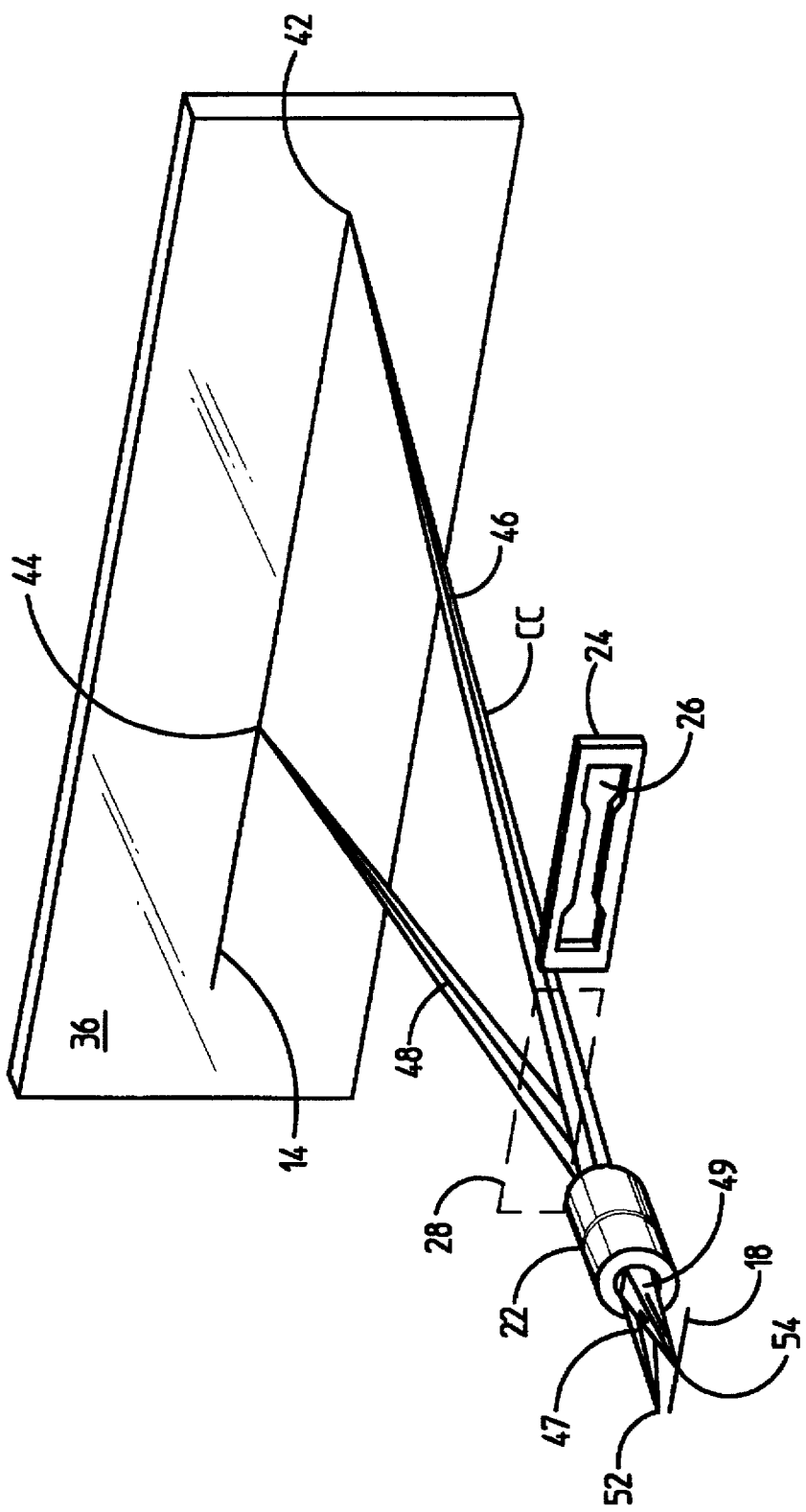
FIG. 3 is a schematic perspective view illustrating light cones associated with two light points in a line-focus system.
Figure 4:
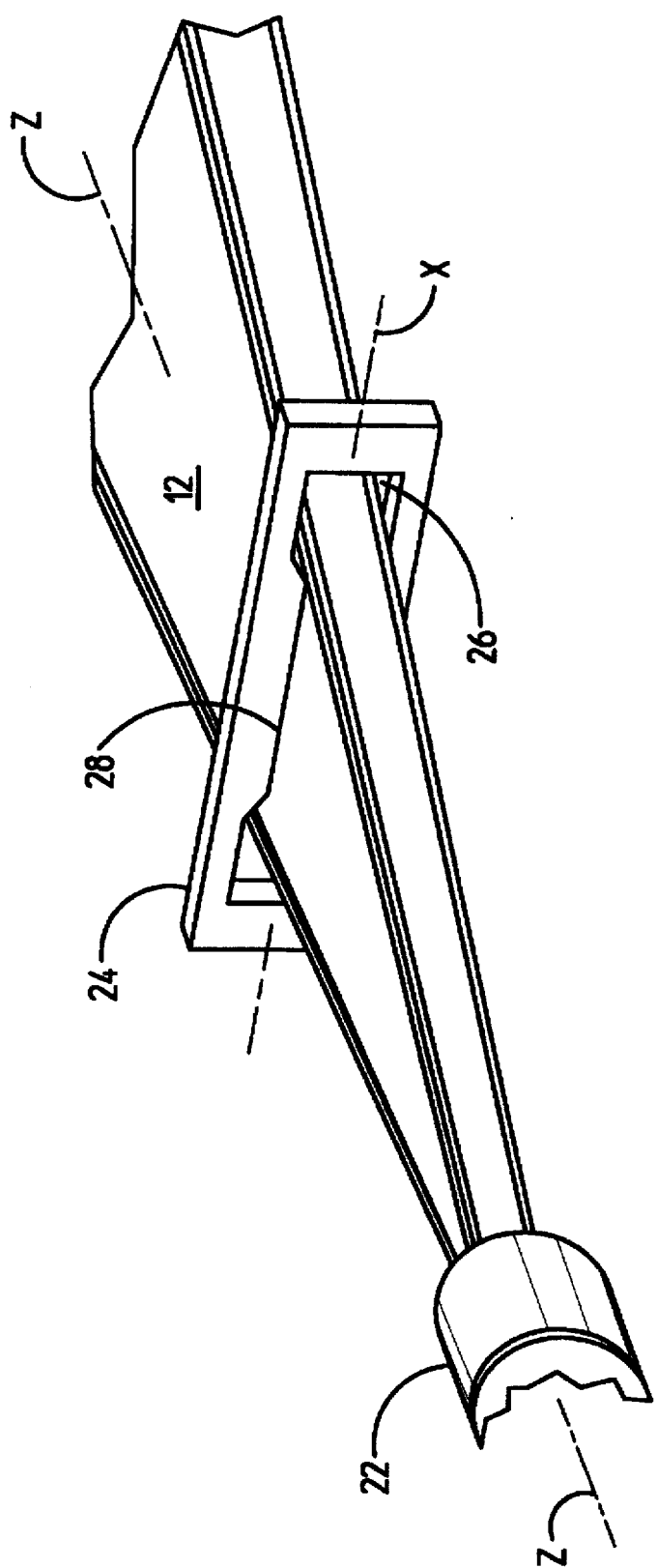
FIG. 4 is a perspective view of the line-focus system of FIG. 1 with an occluding aperture in place in the light path.

Component portions of light in light path 12 may be imagined, for purposes of explanation, as illustrated in FIG. 3. Light rays emanating from an end point 42 of illuminated line object 14 which pass through the clear aperture of lens 22 form a diverging, generally conically-shaped bundle 46. The light rays in light cone 46, after passing through lens assembly 22, form a second cone 47 which converges at image point 52. Similarly, light from a central point on line object 14 forms a generally conical light bundle 48 which, after passing through the clear aperture of lens assembly 22, converges, as illustrated at 49, into image line light point 54. Since line object 14 has an infinite number of light points, it will be appreciated that the light path 12 comprises an infinite number of overlapping light cones. A typical aperture placement in light path 12 is illustrated in FIG. 4. The central longitudinal axis XX of the aperture opening 26 is positioned coplanar with the central plane 60 of the light path and perpendicular to the lens and light path central longitudinal axes as represented by ZZ.

Figure 5:
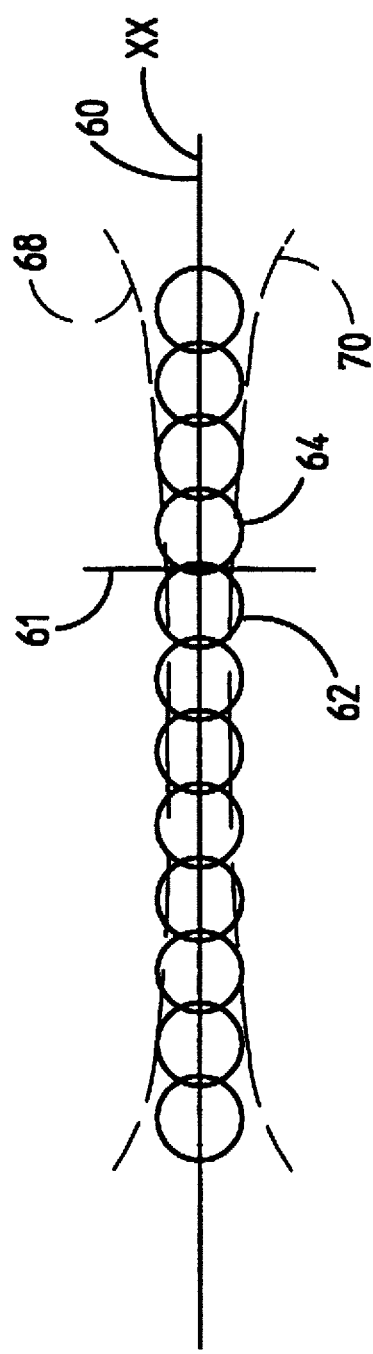
FIG. 5 is a schematic cross-sectional view of overlapping light cones in the plane of an occluding aperture.

The overlapping of projected circle portion of light cones which occurs at aperture 24 is illustrated schematically in FIG. 5. Any region, e.g., 61, along the aperture axis XX necessarily occludes light from many different overlapping light circles, e.g., 62, 64, etc. (In FIG. 5, only a very small number of the nearly infinite number of overlapping light circles have been shown.) FIG. 5 also illustrates the general shape of the aperture opening 26. It is known from applicant's past design experience that the aperture opening should be generally "bow-tie" or "dog-bone" shaped in order to proportionally occlude more light at the center and less light at the ends of the light path. It is also known that, due to the symmetry of the light path, an aperture opening having mirror-image upper and lower peripheries 68, 70, respectively, is required.

Figure 6:
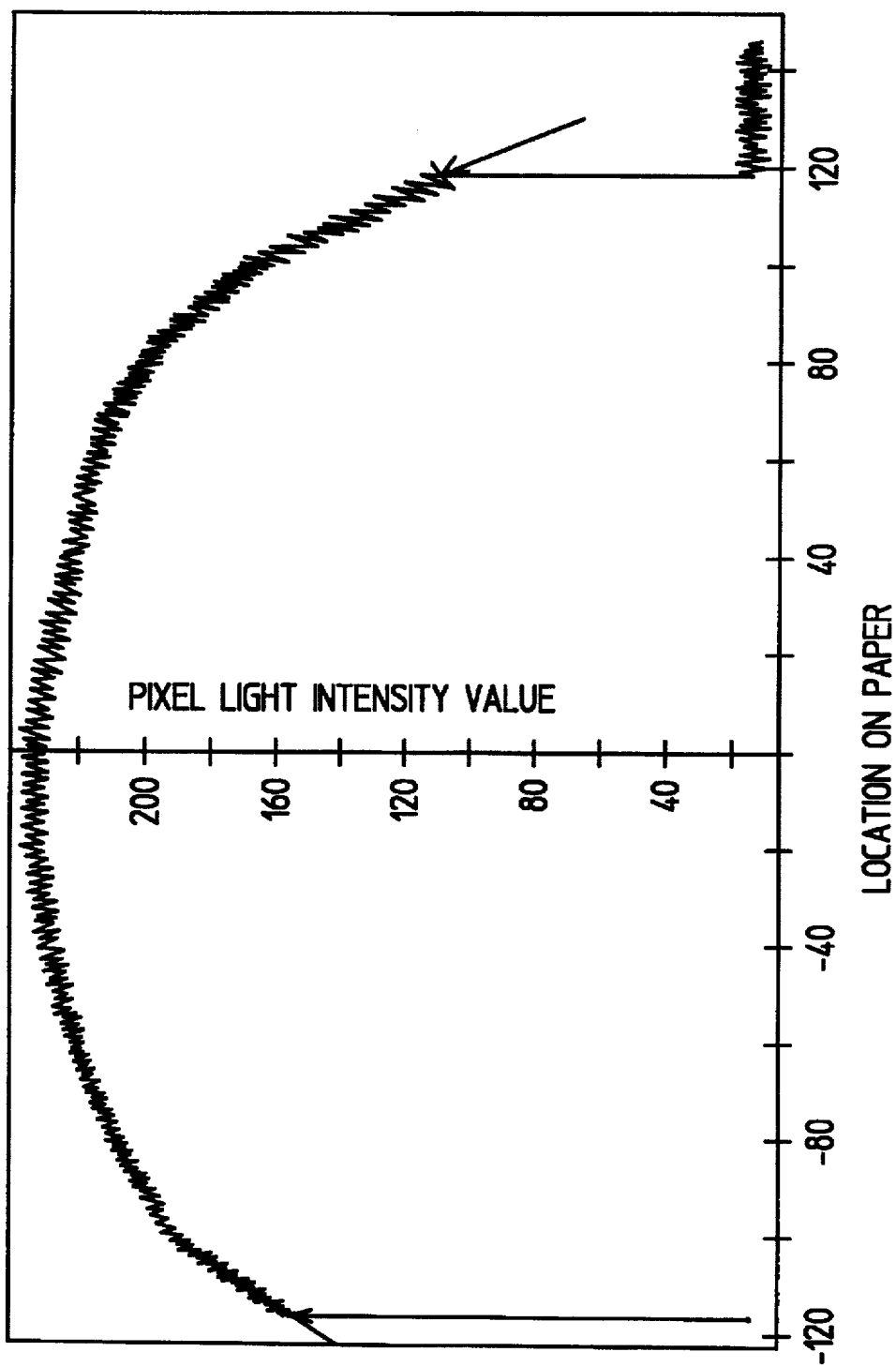
FIG. 6 is a graph representing measured light intensity in a line-focus system having no occluding aperture.

A typical measurement of light intensity across the photosensor array in a line-focus system without an occluding aperture is illustrated in FIG. 6. The units on the horizontal axis are representative of the position of points or "pixels" on the line object since each element in the photosensor array is associated with a point (actually, a small area region) on the line object. The units for the pixel light intensity value are irrelevant for the purposes of the invention and may be any unit which the measurement system provides. It is preferable in a line-focus system that the light intensity be as even as possible, rather than more intense in the middle as shown in FIG. 6. The data processing system of a line-focus system can "calibrate out" small variations in light intensity, but not large changes across the object. However, large changes in light intensity are normally seen in an line-focus system of this type without an occluding aperture to correct the light intensity.

Figure 7:
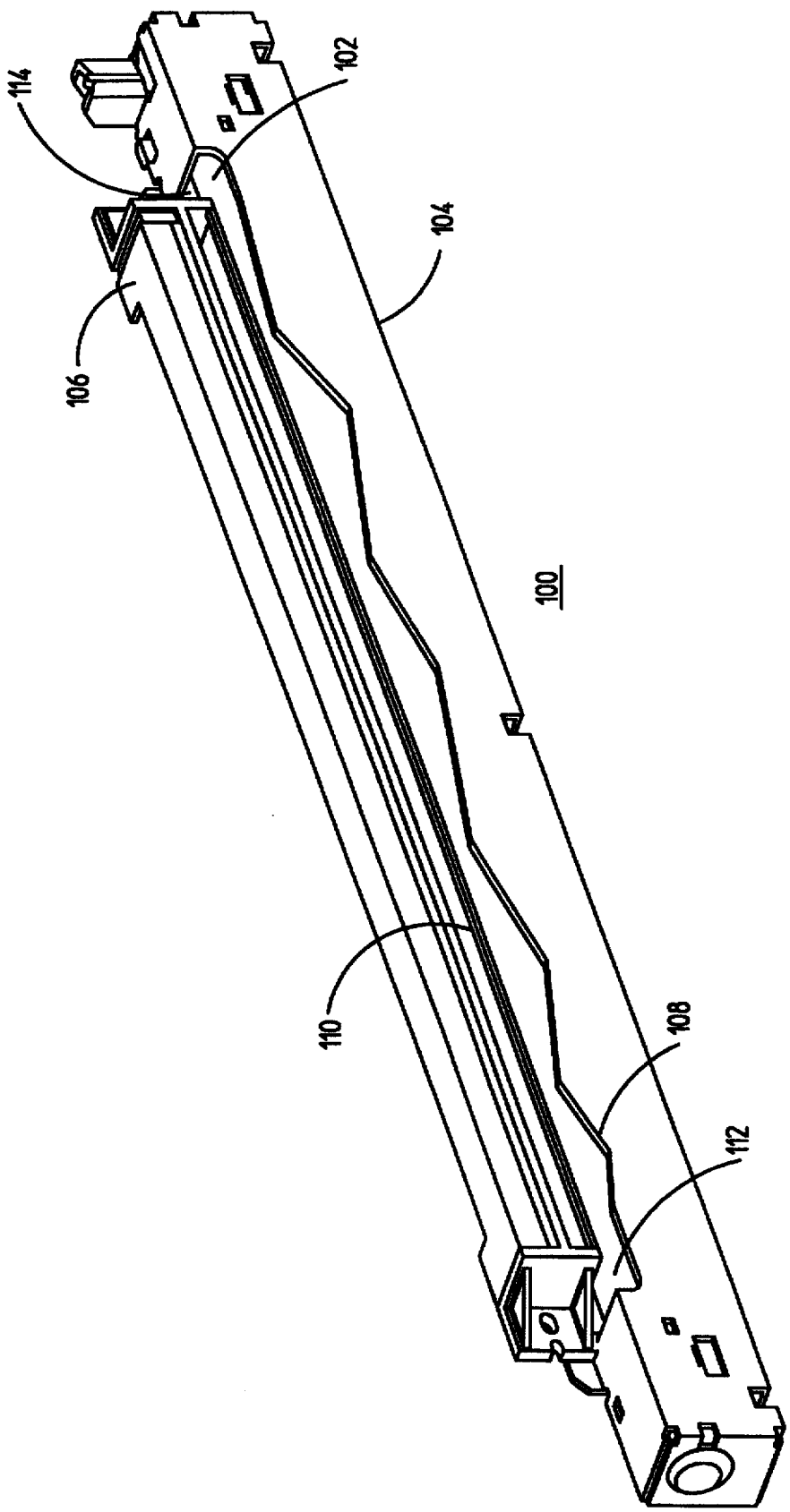
FIG. 7 is a first side perspective view of a light source assembly with a plastic occluding aperture assembly attached thereto.
Figure 8:
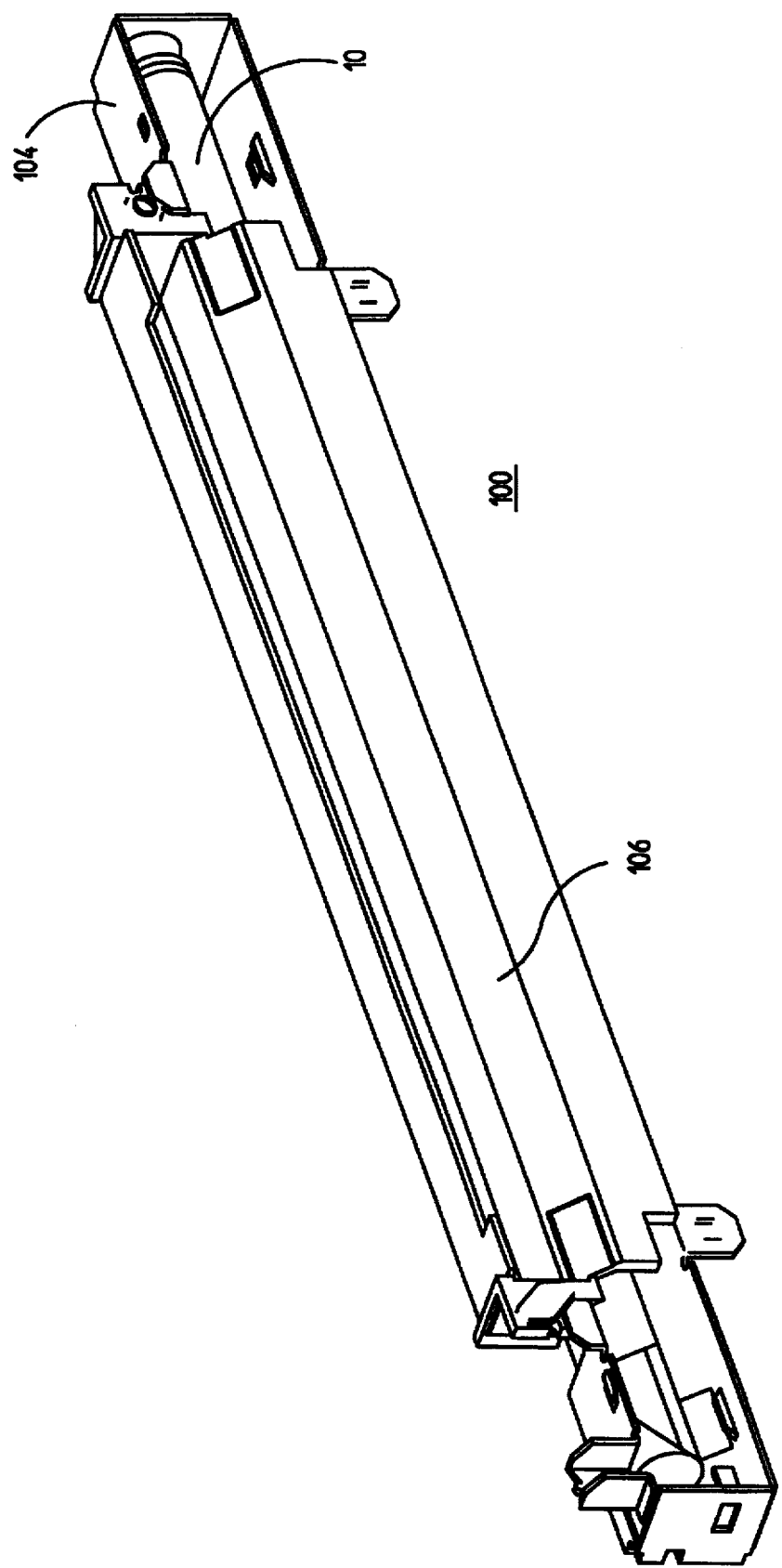
FIG. 8 is a second side perspective view of the light source assembly with a plastic occluding aperture assembly attached thereto of FIG. 7.

A typical lamp assembly 100 for a line-focus system is illustrated in FIGS. 7 and 8. Lamp assembly 100 comprises a bulb 102, a bulb enclosure assembly 104, and an aperture assembly 106. It will be noted that bulb enclosure assembly 104 is open on two sides and aperture assembly 106 is connected to bulb chassis and assembly 104 and wraps around most of the opening in bulb enclosure assembly 104, creating a predetermined opening between bulb enclosure assembly edge 108 and aperture assembly edge 110. Attaching an aperture assembly 106 to the bulb chassis and assembly 104, rather than having the bulb enclosure assembly wrap around the bulb 102 permits the bulb to be changed as needed and the other components in the bulb enclosure assembly 104 to be changed-out and repaired as necessary.

The size and shape of the opening between the bulb enclosure assembly 104 and the aperture assembly 106 is predetermined in order to make the light intensity across the linear photosensor array as uniform as possible. One method of determining the size and shape of the opening between the bulb enclosure assembly 104 and the aperture assembly 106 is described in U.S. Pat. No. 4,959,541, entitled "Method for Determining Aperture Shape" to David W. Boyd, which is hereby specifically incorporated by reference for all that is disclosed therein.

It should be further noted that the aperture assembly 106 wraps most of the way around the two open sides in the bulb enclosure assembly 104 in order to block any stray light, other than that specifically directed through the opening between the bulb enclosure assembly 104 and the aperture assembly 1–6, from entering the line-focus system. It will be readily appreciated that the shape of the aperture opening between the bulb enclosure assembly 104 and the aperture assembly 106 at any point beyond the outer edge of the light path is irrelevant to aperture performance. Accordingly, the shape of the aperture at ends 112 and 114 is irrelevant to the uniformity of the light intensity in the line-focus system.

Figure 9:
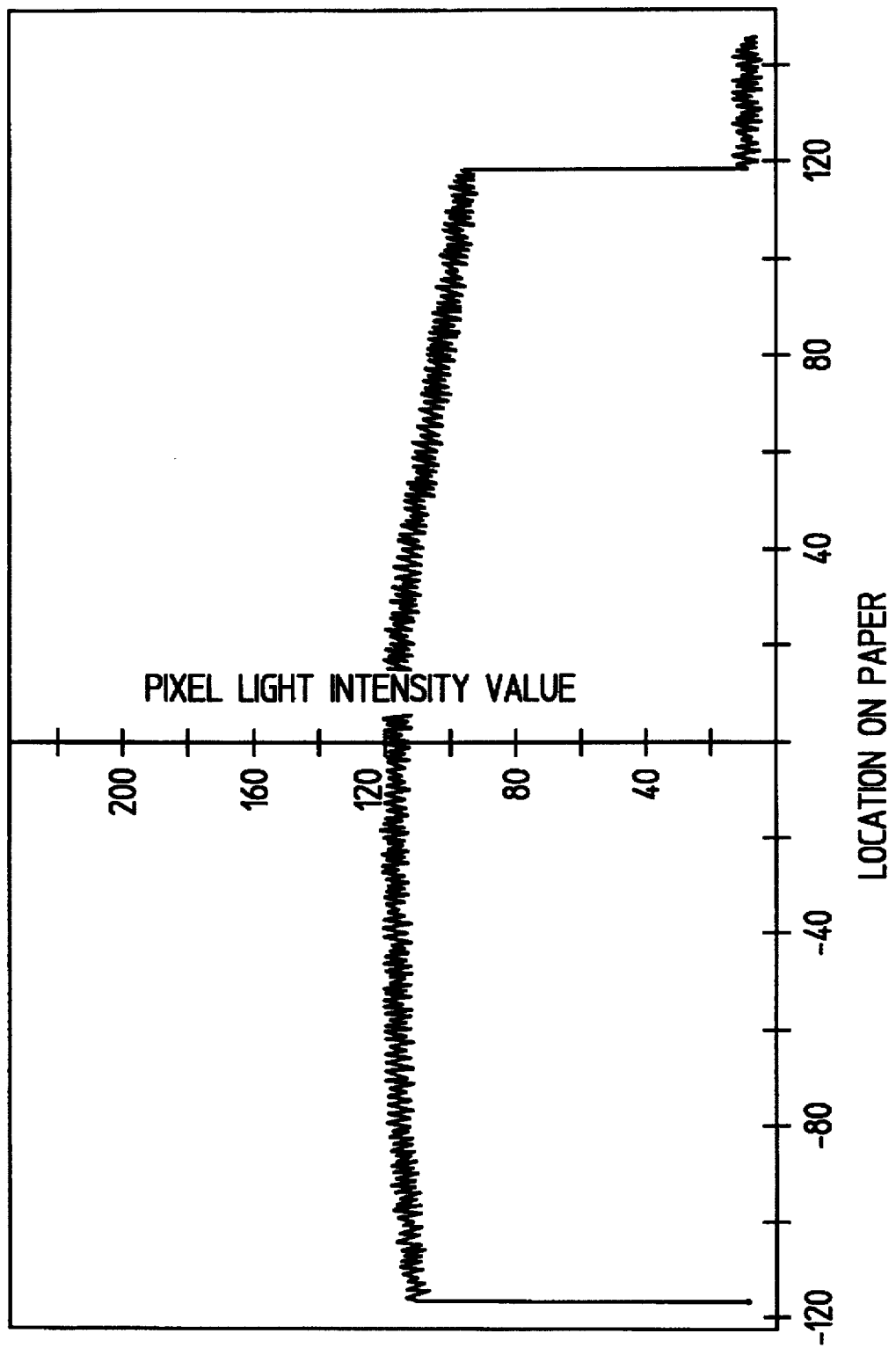
FIG. 9 is a graph representing measured light intensity in a line-focus system having the plastic occluding aperture assembly of FIGS. 7 and 8.

A typical measurement of light intensity across the photosensor array in a line-focus system with the lamp assembly of FIGS. 7 and 8 is illustrated in FIG. 9. The units on the horizontal axis are representative of the position of points or "pixels" on the line object since each element in the photosensor array is associated with a point (actually, a small area region) off the line object. The units for the pixel light intensity value are irrelevant for the purposes of the invention and may be any unit which the measurement system provides. It will be noted that the light intensity across the photosensor array in the line-focus system with the lamp assembly of FIGS. 7 and 8 is relatively flat as evidenced by the graph of FIG. 9.

The disadvantage of the lamp assembly 100 of FIGS. 7 and 8 is that bulb enclosure assembly 104 and aperture assembly 106 are generally made of plastic in order to decrease the material cost and the overall line-focus system weight. Accordingly, the bulb enclosure assembly 104 and the aperture assembly 106 must by constructed in such a manner that they are a certain distance (in most instances approximately 0.5 mm) away from the bulb 102, so that the plastic does not degrade in any way. This distance that the bulb enclosure assembly 104 and the aperture assembly 106 must be from the bulb 102 causes the bulb 102 to be further from the scan line than is desirable and causes a greater than desirable angle between the light source (bulb 102) and the scan line. Moreover, it is readily apparent that the aperture assembly 106 adds significantly to the size of the lamp assembly 100, thus increasing the overall size of the line-focus assembly, which is a drawback for the new hand-held, brief case and low profile scanners.

Figure 15:
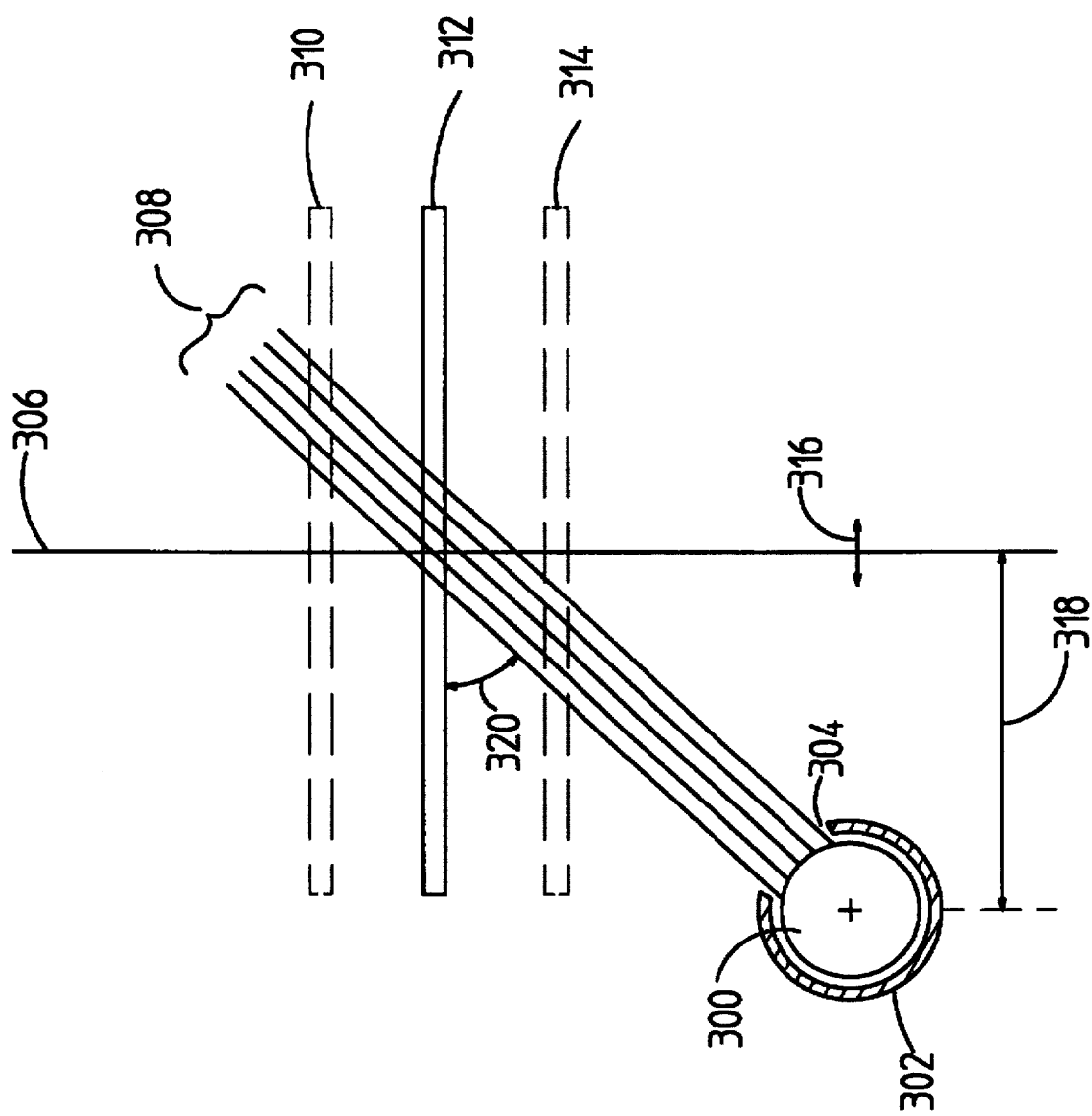
FIG. 15 is a drawing of how the scan line position relative to the light source effects the depth of illumination in the prior art.

FIG. 15 shows a perspective drawing of how the scan line position relative to the light source effects the depth of illumination. Specifically, light bulb 300 surrounded by bulb enclosure assembly 302 with occluding aperture 304 directs light 308 toward object 312 at angle 320. Because the light bulb 300 has to be further away from scan line 306 than desired in a prior art system with a high profile, plastic occluding aperture, angle 320 is more severe than desired. This phenomenon requires that the object be located in a particular position (or narrow range of positions). If the position of the object is varied to position 310 or position 314, then the image will appear dark. This is referred to as the depth of illumination of the optical system, which is a cornion degrading factor in line-focus systems. For most line-focus systems, such as scanners, copiers and fax machines, the depth of illumination has more of an adverse effect on the image quality then the depth of field or the depth of focus on the image side. These height variations are caused by common manufacturing tolerances and through use, etc. of the product, such as when a user "pushes" a book flat on a copier.

Figure 16:
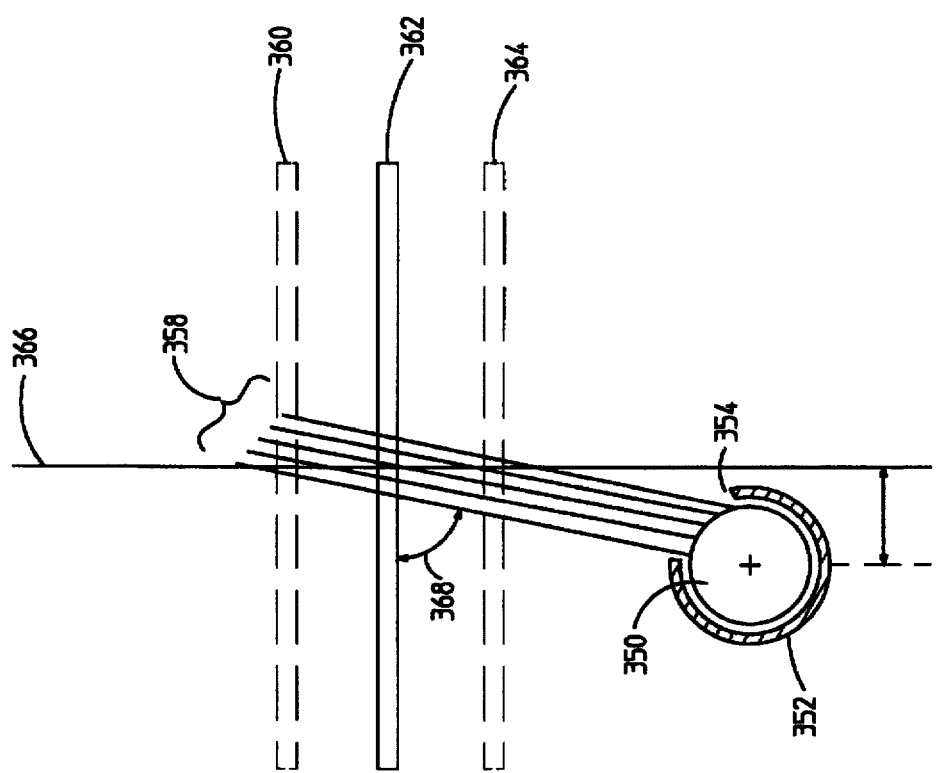
FIG. 16 is a drawing of how the scan line position relative to the light source effects the depth of illumination in the present invention.

FIG. 16 shows a perspective drawing of how the scan line position relative to the light source effects the depth of illumination with respect to the present invention. Specifically, because the aperture label 352 of the present invention has a much lower profile than the plastic occluding apertures of the prior art, the light bulb 350 can be located closer 356 to the scan line 366, which creates a less severe angle 368 between the light source and the object. This results in a greater depth of illumination, which means that the optical system is more tolerant of changes in the position of the object (362, 360, 364), while still allowing satisfactory image quality.

Figure 10:
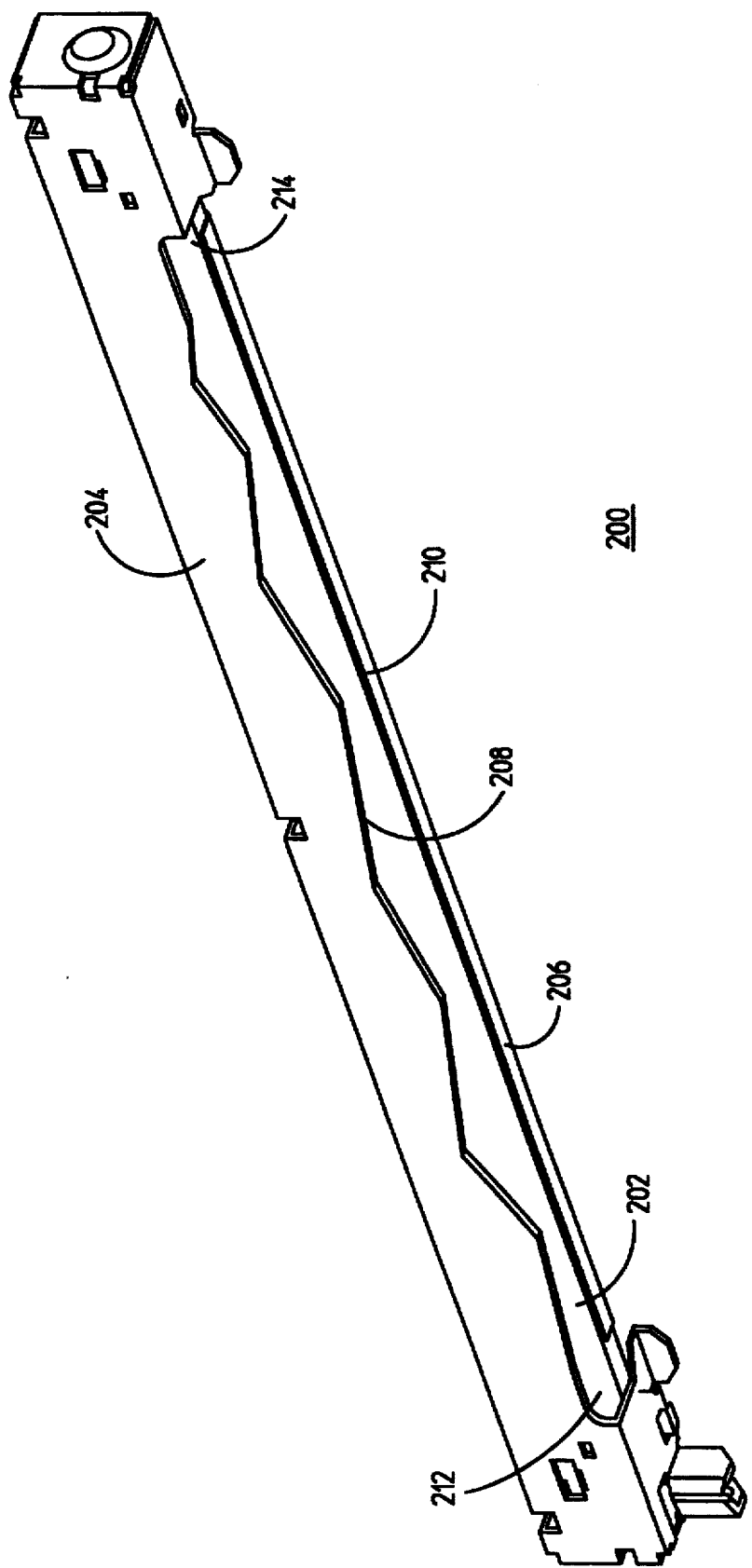
FIG. 10 is a first side perspective view of a light source assembly with an occluding label aperture attached thereto according to the present invention.
Figure 11:
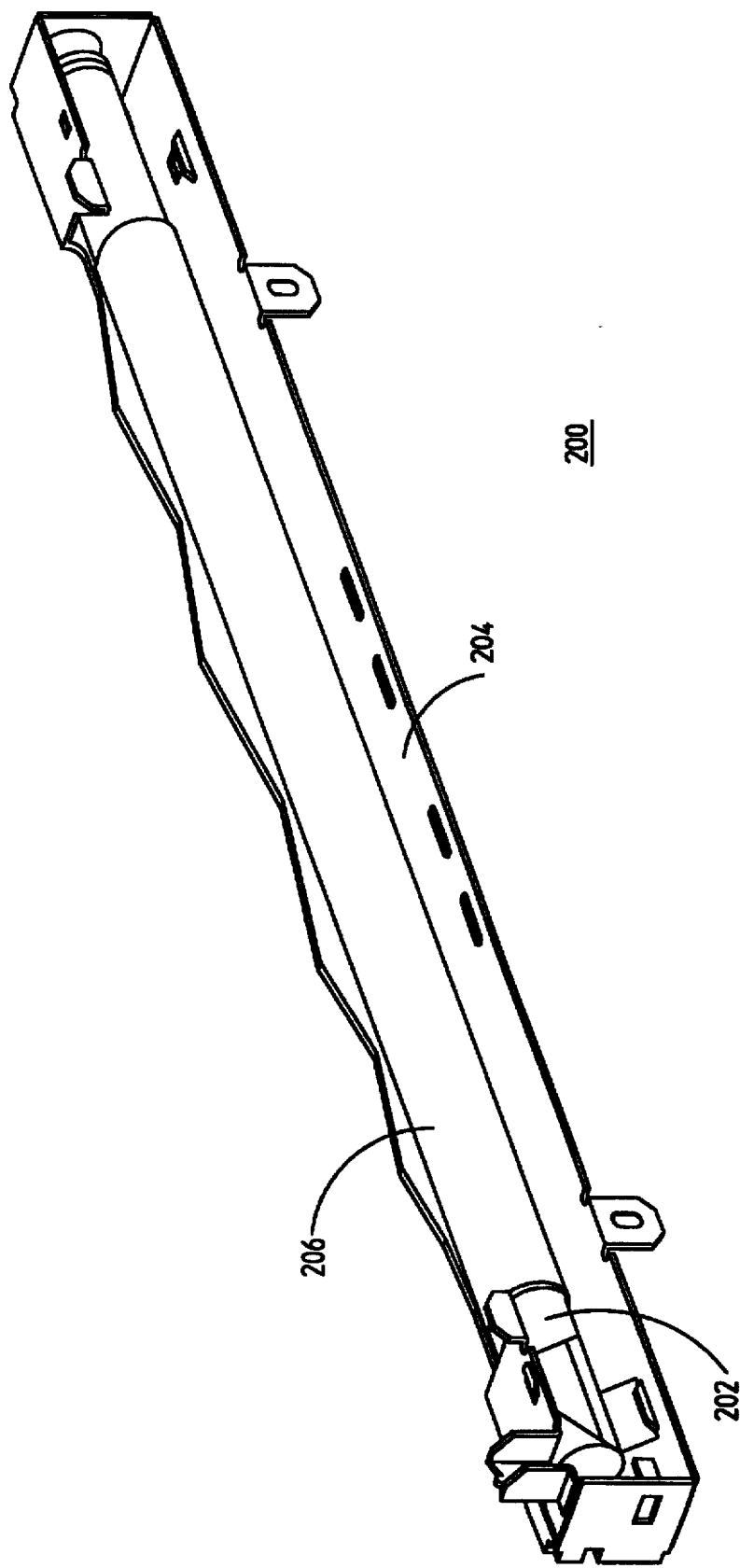
FIG. 11 is a second side perspective view of the light source assembly with an occluding label aperture attached thereto according to the present invention.

A lamp assembly 200 for a line-focus system according to the present invention is illustrated in FIGS. 10 and 11. Lamp assembly 200 comprises a bulb 202, a bulb enclosure assembly 204, and a lamp label 206. It will be noted that bulb enclosure assembly 204 is open on two sides and lamp label 206 is attached to bulb 202 and wraps most of the way around bulb 202, creating a predetermined opening between bulb enclosure assembly edge 208 and lamp label edge 210. Attaching lamp label 206 to the bulb 202, rather than having the bulb enclosure assembly wrap around the bulb 202 permits the bulb to be changed as needed and the other components in the bulb enclosure assembly 104 to be changed-out and repaired as necessary. The lamp label aperture of the present invention also has an advantage over the lamp assembly of FIGS. 7 and 8 in that in the present invention, the lamp aperture assembly 106 of FIGS. 7 and 8 does not have to be disconnected from the bulb chassis and assembly in order to change the bulb or to repair or change components in the bulb enclosure assembly.

The size and shape of the opening between the bulb enclosure assembly 204 and the lamp label 206 is predetermined in order to make the light intensity across the linear photosensor array as uniform as possible. Again, one method of determining the size and shape of the opening between the bulb enclosure assembly 204 and the lamp label 206 is described in U.S. Pat. No. 4,959,541, entitled "Method for Determining Aperture Shape" to David W. Boyd, as stated above.

Lamp label 206 can be any opaque, adhesive type tape or label that is capable of withstanding heat from bulb 202. However, lamp label 206 is preferably a black or other dark, non-reflective color that will block out light and decrease reflection of stray light into the line-focus system. It should be noted that in a typical line-focus system, the bulb is a fluorescent bulb that can get as hot as 93° C. Other types of light sources can also be used, obviously the size and shape of the occluding label for a different type of light source would have to be modified to accommodate the size and shape of the light source and the amount of occluding necessary to make the light sensed at the sensor array relatively uniform. In a preferred embodiment, lamp label 206 is 0.064 mm thick M-705, black polyester tape that is capable of withstanding heat up to 130° C. from Furon, 407 E. Street, P.O. Box 1911, New Haven, Conn. 06509-1911. Lamp label 206 can be cut into any shape aperture which would change the illumination profile to the desired intensity.

Figure 13:
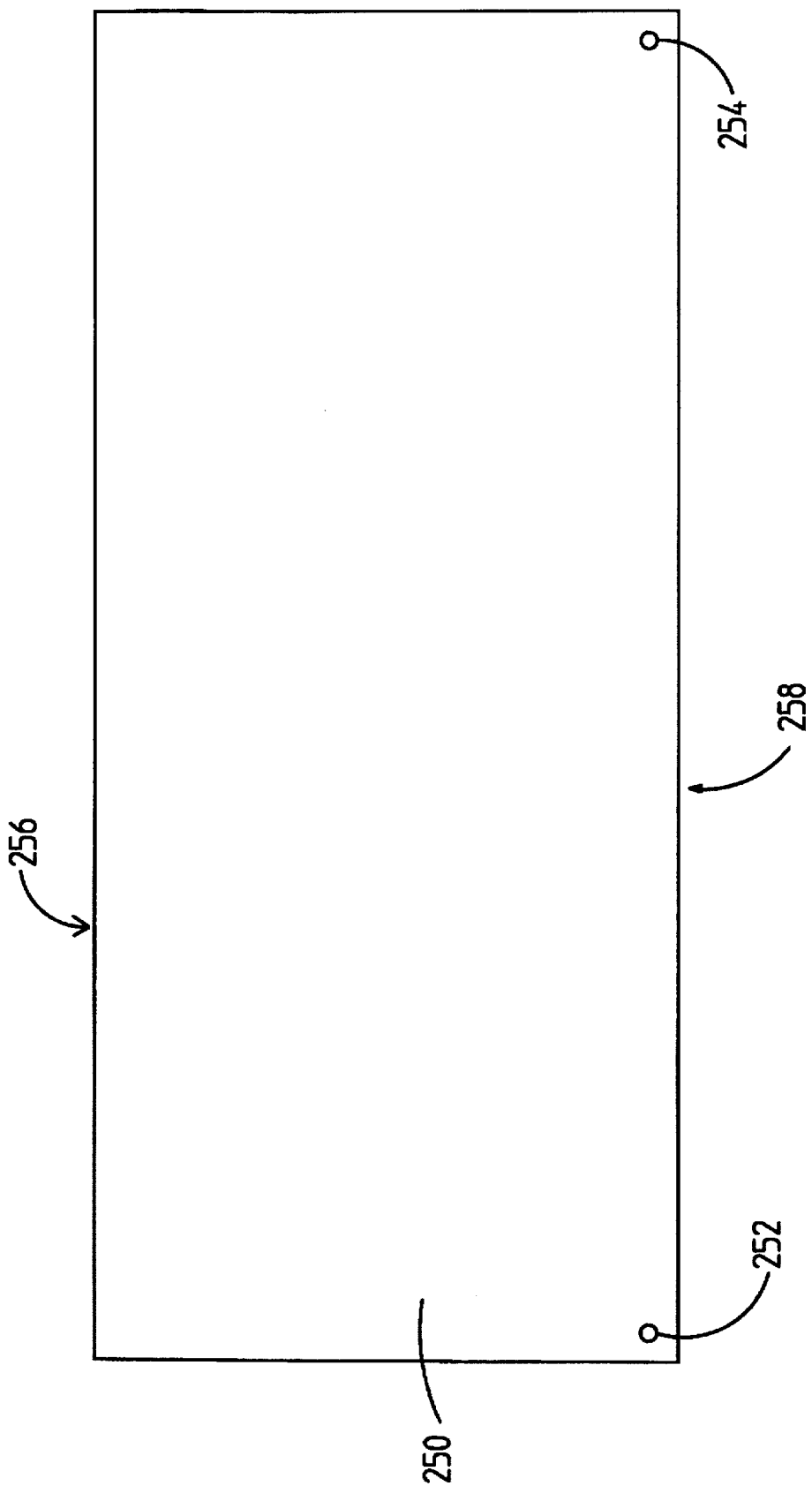
FIG. 13 is a flat view of a lamp label according to a first embodiment of the present invention.
Figure 14:
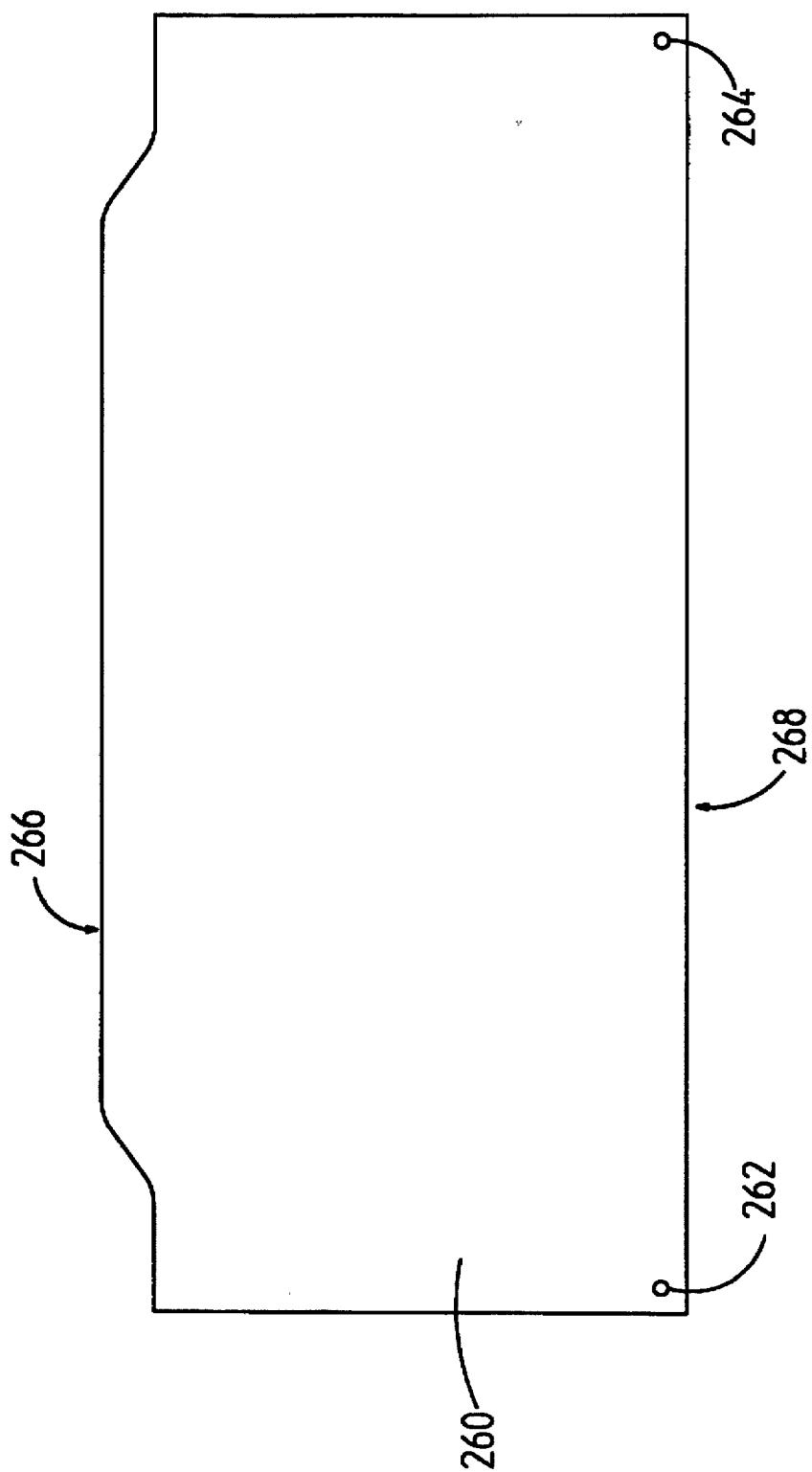
FIG. 14 is a flat view of a lamp label according to a second embodiment of the present invention.

FIG. 13 shows a lamp label 250 with tooling holes 252 and 254 and a straight aperture edge 256. Tooling holes 252 and 254 may be used for cutting the lamp label and for aligning the lamp label when applying it to the bulb 202. FIG. 14 shows a lamp label 260 with tooling holes 262 and 264 and a varying aperture edge 266. Straight aperture edge 256 and varying aperture edge 266 would be equivalent to lamp label aperture edge 210 in FIG. 10. It should also be noted that if the bulb enclosure assembly 204 did not enclose the bulb 202 on two sides, the lamp label 206 could be made with both edges 256 and 258 (or 266 and 268) creating the occluded aperture in order to vary the illumination intensity across the sensor array, rather than relying on the bulb enclosure assembly 204 to create one side of the occluded aperture.

Lamp label 206 can easily be pre-cut or stamped with a peel-off backing and applied directly to the bulb 202 during the assembly of the bulb enclosure assembly 204. If the bulb 202 needs to be changed, the lamp label 206 would generally be cheap enough to be thrown out with the old bulb. It should be further noted that the lamp label 206 wraps most of the way around the bulb 202 on the two open sides in the bulb enclosure assembly 204 in order to block any stray light, other than that specifically directed through the opening between the bulb enclosure assembly 204 and the lamp label 206, from entering the line-focus system. Although in the present case the bulb enclosure assembly 204 makes up part of the lamp aperture opening, this is not necessary. For example, if the shape of the bulb enclosure assembly 204 is changed, for example, to decrease the size, weight and cost of the overall assembly, the lamp label 206 can be readily changed to wrap almost entirely around bulb 202, thus creating the aperture with only the lamp label 206.

It will be readily appreciated that the shape of the aperture opening between the bulb enclosure assembly 204 and the lamp label 206 at any point beyond the outer edge of the light path is irrelevant to ampere performance. Accordingly, the shape of the aperture at ends 212 and 214 is irrelevant to the uniformity of the light intensity in the line-focus system.

Figure 12:
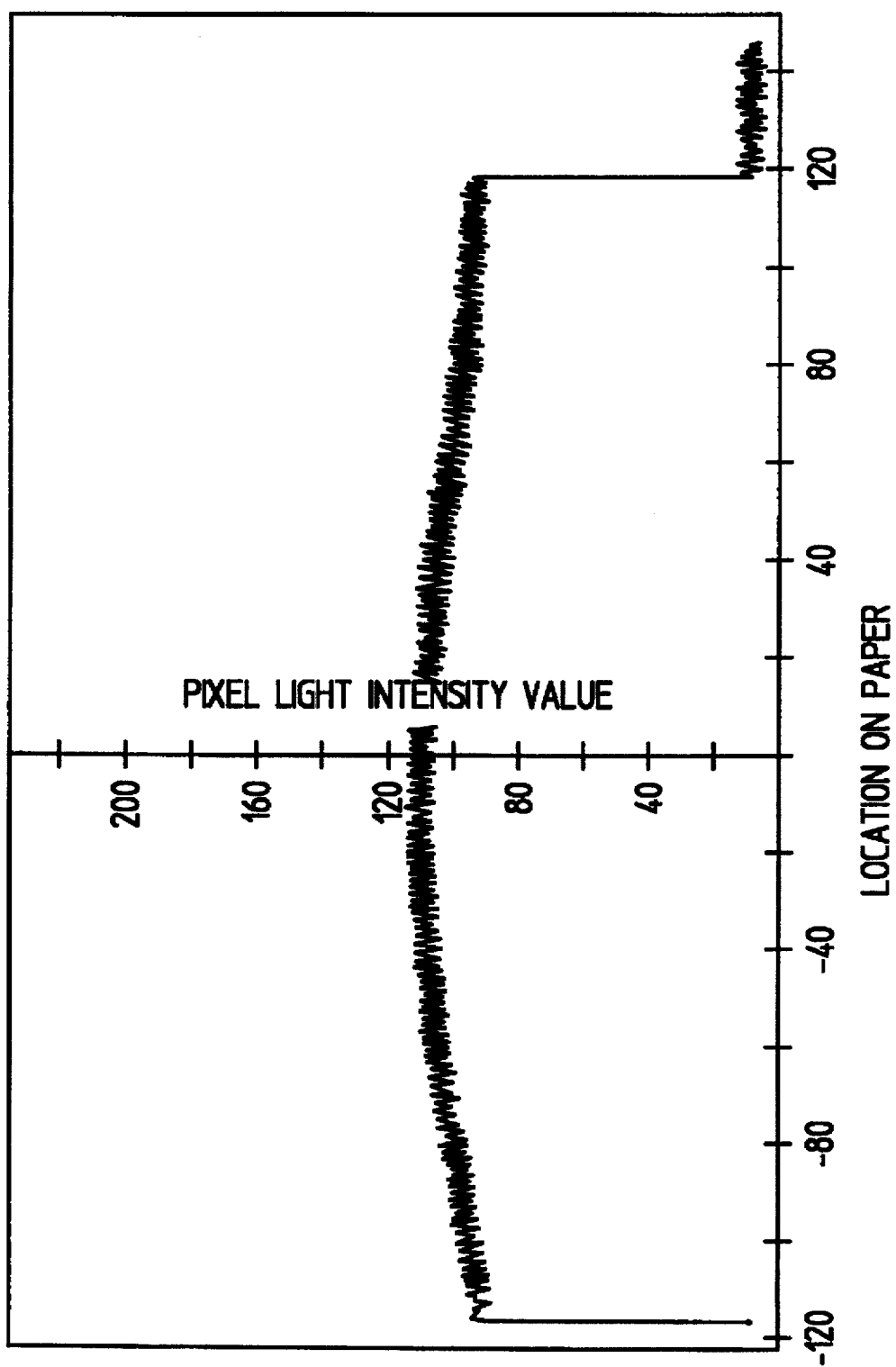
FIG. 12 is a graph representing measured light intensity in a line-focus system having the occluding label aperture attached thereto according to the present invention.

A typical measurement of light intensity across the photosensor array in a line-focus system with the lamp assembly of FIGS. 10 and 11 is illustrated in FIG. 12. The units on the horizontal axis are representative of the position of points or "pixels" on the fine object since each element in the photosensor array is associated with a point (actually, a small area region) on the line object. The units for the pixel light intensity value are irrelevant for the purposes of the invention and may be any unit which the measurement system provides. It will be noted that the light intensity across the photosensor array in the line-focus system with the lamp assembly of the present invention is relatively flat as evidenced by the graph of FIG. 12.

The advantages of the present invention over the typical lamp assembly aperture as shown in FIGS. 7 and 8 is lower part costs, lower tooling costs, easier to change aperture and light profile, fewer parts and lower assembly costs, easier to change the light bulb or to work on components within the bulb enclosure assembly, more freedom in the positioning of the bulb with respect to the its distance from the scan line, and more freedom with respect to the angle between the light source (bulb) and the scan line.

It should also be noted that the prior art places an occluding aperture between the object and the image, whereas the present invention places the occluding aperture between the light source and the object. However, both methods have the same effect in making the light sensed across the sensor array more uniform.

What is claimed is:

1. A line-focus system comprising:

a light source, said light source being a cylinder with a center section and two opposing end sections;

an object, said light source directing light toward said object;

a photosensor array, wherein said light directed toward said object is reflected by said object and directed toward said photosensor array; and at least one occluding aperture label adhesively attached to and curving with the surface of said light source, said at least one occluding aperture label covering substantially all of the surface of said light source, wherein the aperture of said occluding aperture label is narrower toward said center section of said light source than toward said two end sections of said light source, wherein the aperture of said occluding aperture label is shaped in such a manner that the light sensed by said photosensor array has a relatively uniform intensity across the photosensor array.

2. A method of manufacturing a line-focus system, said method comprising the following steps:

(a) providing an object;

(b) providing a light source, said light source directing light toward said object, said light source being a cylinder with a center section and two opposing end sections;

(c) providing a photosensor array, wherein said light directed toward said object is reflected by said object and directed toward said photosensor array; and (d) attaching at least one occluding aperture label adhesively to and curvingly with the surface of said light source said at least one occluding aperture label covering substantially all of the surface of said light source, wherein the aperture of said occluding aperture label is narrower toward said center section of said light source than toward said two end sections of said light source, wherein the aperture of said occluding aperture label is shaped in such a manner that the light sensed by said photosensor array has a relatively uniform intensity across the photosensor array.

* * * * *